(12) United States Patent
Zhang et al.

(10) Patent No.: US 11,508,351 B2
(45) Date of Patent: Nov. 22, 2022

(54) MULTI-TASK DEEP NETWORK FOR ECHO PATH DELAY ESTIMATION AND ECHO CANCELLATION

(71) Applicant: Beijing DiDi Infinity Technology and Development Co., Ltd., Beijing (CN)

(72) Inventors: Yi Zhang, Mountain View, CA (US); Chengyun Deng, Beijing (CN); Shiqian Ma, Beijing (CN); Yongtao Sha, Beijing (CN); Hui Song, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 17 days.

(21) Appl. No.: 17/188,406

(22) Filed: Mar. 1, 2021

(65) Prior Publication Data

US 2022/0277721 A1    Sep. 1, 2022

(51) Int. Cl.
| | |
|---|---|
| *H04B 3/20* | (2006.01) |
| *G10K 11/178* | (2006.01) |
| *G06N 3/04* | (2006.01) |
| *G06N 3/08* | (2006.01) |
| *H03G 3/00* | (2006.01) |

(52) U.S. Cl.
CPC ..... *G10K 11/17815* (2018.01); *G06N 3/0445* (2013.01); *G06N 3/0454* (2013.01); *G06N 3/08* (2013.01); *G10K 11/17881* (2018.01); *G10K 2210/3026* (2013.01); *G10K 2210/3027* (2013.01); *G10K 2210/3038* (2013.01); *G10K 2210/505* (2013.01)

(58) Field of Classification Search
CPC ....... G10K 11/17815; G10K 11/17881; G10K 2210/3026; G10K 2210/3027; G10K 2210/3038; G10K 2210/505; G06N 3/0445; G06N 3/0454; G06N 3/08
USPC .................................................... 381/66, 61
See application file for complete search history.

(56) References Cited

U.S. PATENT DOCUMENTS 10,650,840 B1 *  5/2020  Solbach .............. G10L 21/0224

OTHER PUBLICATIONS

Eberhard Hansler et al., Acoustic Echo and Noise Control: A Practical Approach, Adaptive and Learning Systems for Signal Processing, Communications, and Control, Hoboken, NJ, Wiley-Interscience, 2004.

(Continued)

*Primary Examiner* — Ammar T Hamid
(74) *Attorney, Agent, or Firm* — Sheppard Mullin Richter & Hampton LLP (57) ABSTRACT

A method of echo path delay destination and echo cancellation is described in this disclosure. The method includes: obtaining a reference signal, a microphone signal, and a trained multi-task deep neural network, wherein the multi-task deep neural network comprises a first neural network and a second neural network; generating, using the first neural network of the multi-task deep neural network, an estimated echo path delay based on the reference signal and the microphone signal; updating the reference signal based on the estimated echo path delay; and generating, using the second neural network of the multi-task deep neural network, an enhanced microphone signal based on the microphone signal and the updated reference signal.

20 Claims, 7 Drawing Sheets

(56) References Cited

OTHER PUBLICATIONS

S. Gustafsson et al., "Combined Acoustic Echo Control and Noise Reduction for Hands-Free Telephony," Signal Processing, vol. 64, No. 1, 1998, pp. 21-32.

Valerie Turbin et al., "Comparison of Three Post-Filtering Algorithms for Residual Acoustic Echo Reduction," in Proc. IEEE International Conf. on Acoustic, Speech, and Signal Processing, 1997, pp. 307-310.

Youhong Lu et al., "Enhancing Echo Cancellation via Estimation of Delay," IEEE Transactions on Signal Processing, vol. 53, No. 11, Nov. 2005, pp. 4159-4168.

Jivesh Govil, "Enhanced Residual Echo Cancellation Using Estimation of Delay and Fast LMS/Newton Algorithm based on Autoregressive Model," in 40th Annual Conf. on Information Science and Systems, Princeton, 2006.

Rafid A. Sukkar, "Echo Detection and Delay Estimation Using a Pattern Recognition Approach and Cepstral Correlation," in IEEE Intl. Conf. on Acoustics, Speech, and Signal Processing, Honolulu, 2007.

Ralph O. Schmidt, "Multiple Emitter Location and Signal Parameter Estimation," IEEE Transactions on Antennas and Propagation, vol. AP-34, No. 3, Mar. 1986, pp. 276-280.

Richard Roy et al., "ESPRIT—Estimation of Signal Parameters Via Rotational Invariance Techniques," IEEE Transactions on Acoustics, Speech, and Signal Processing, vol. 37, No. 7, Jul. 1989, pp. 984-995.

Charles H. Knapp et al., "The Generalized Correlation Method for Estimation of Time Delay," IEEE Transactions on Acoustics, Speech, and Signal Processing, vol. ASSP-24, No. 4, Aug. 1976, pp. 320-327.

Sharath Adavanne et al., "Direction of Arrival Estimation for Multiple Sound Sources Using Convolutional Recurrent Neural Network," arXiv:1710.10059v2 [cs.SD] Aug. 5, 2018.

Karim Guirguis et al., "SELD-TCN: Sound Event Localization & Detection via Temporal Convolutional Networks," arXiv:2003.01609v1 [eess.AS], Mar. 3, 2020.

Soumitro Chakrabarty et al., "Multi-Speaker DOA Estimation Using Deep Convolutional Networks Trained with Noise Signals," arXiv:1807.11722v1 [eess.AS] Jul. 31, 2018, pp. 1-10.

Chul Min Lee et al., "DNN-ased Residual Echo Suppression," in Proc. Conf. of International Speech Communication Association, 2015 ISCA, Sep. 6-10, 2015, Dresden, Germany, pp. 1775-1779.

Michael Muller et al., "Linear Acoustic Echo Cancellation Using Deep Neural Networks and Convex Reconstruction of Incomplete Transfer Function," IEEE International Workshop of Electronics, Control, Measurement, Signals and their Application to Mechatronics, 2017.

Hao Zhang et al., "Deep Learning for Acoustic Echo Cancellation in Noisy and Double-Talk Scenarios," Proc. Conf. of International Speech Communication Association, Interspeech 2018, Sep. 2-6, 2018, Hyderabad, pp. 3239-3243.

Guillaume Carbajal et al., "Multiple-input neural network-based residual echo suppression," IEEE International Conference on Acoustics, Speech and Signal Processing, Apr. 2018, Calgary, Canada, pp. 1-5.

Hao Zhang et al., "Deep Learning for Joint Acoustic Echo and Noise Cancellation with Nonlinear Distortions," in Proc. Conf. International Speech Communication Association, 2019 ISCA, Sep. 15-19, 2019, Graz, Austria, pp. 4255-4259.

Amin Fazel et al., "Deep Multitask Acoustic Echo Cancellation," Proc. Conf. International Speech Communication Association, 2019 ISCA, Sep. 15-19, 2019, Graz, Austria, pp. 4250-4254.

Yi Zhang et al., "Generative Adversarial Network Based Acoustic Echo Cancellation," Proc. Conf. of International Speech Communication Association, 2020 ISCA, Oct. 25-29, 2020, Shanghai, China, pp. 3945-3949.

Sergey Ioffe et al., "Batch Normalization: Accelerating Deep Network Training by Reducing Internal Covariate Shift," arXiv:1502.03167v3 [cs.LG] Mar. 2, 2015, pp. 1-11.

Djork-Arne Clevert et al., "Fast and Accurate Deep Network Learning by Exponential Linear Units (ELUs)," arXiv:1511.07289V5 [cs.LG] Feb. 22, 2016, pp. 1-14.

Kaiming He et al., "Deep Residual Learning for Image Recognition," IEEE Conference on Computer Vision and Pattern, 2016.

Xavier Glorot et al., "Deep Sparse Rectifier Neural Networks," Proceedings of the 14th International Conference on Artificial Intelligence and Statistics (AISTATS), 2011, Fort Lauderdale, FL, vol. 15 of JMLR:W&CP 15, pp. 315-323.

Diederik P. Kingma et al., "Adam: A Method for Stochastic Optimization," arXiv:1412.6980v9 [cs.LG] Jan. 30, 2017, pp. 1-15.

Tsung-Yi Lin et al., "Focal Loss for Dense Object Detection," arXiv:1708.02002v2 [cs.CV] Feb. 7, 2018, pp. 1-10.

Lori F. Lamel et al., "Speech Database Development: Design and Analysis of the Acoustic-Phonetic Corpus," Speech Input/Output Assessment and Speech Databases, Jan. 1989, pp. 61-70.

Satoshi Nakamura et al., "Acoustical Sound Database in Real Environments for Sound Scene Understanding and Hands-Free Speech Recognition," in Proc. International Conf. on Language Resources and Evaluation, 2000.

\* cited by examiner

MULTI-TASK DEEP NETWORK FOR ECHO PATH DELAY ESTIMATION AND ECHO CANCELLATION

TECHNICAL FIELD

The disclosure relates generally to audio signal processing, and in particular, to multi-task deep network system and method for echo path delay estimation and echo cancellation.

BACKGROUND

An acoustic echo originates in a local audio loopback. A local audio loopback often occurs when a microphone picks up audio signals from a speaker and sends the audio signals back to a far-end participant. Acoustic echo cancellation (AEC) or suppression (AES) technologies aim to suppress the acoustic echo from a microphone signal whilst leaving the speech of the near-end talker least distorted. Estimation for echo path delay (also referred to as ref-delay) is challenging in AEC and AES. Different devices may introduce various ref-delays in practice. Ref-delay inconsistency slows down the convergence of adaptive filters used in existing AEC or AES technologies and also degrades the performance of deep learning models for echo cancellation or suppression due to "unseen" ref-delays in training data sets. Therefore, there is a need for more effective ref-delay estimation as well as echo cancellation.

SUMMARY

One aspect of the present disclosure is directed to a system for echo path delay estimation and echo cancellation. The system includes: one or more processors; and a memory storing instructions that, when executed by the one or more processors, cause the system to perform: obtaining a reference signal, a microphone signal, and a trained multi-task deep neural network, wherein the multi-task deep neural network comprises a first neural network and a second neural network; generating, using the first neural network of the multi-task deep neural network, an estimated echo path delay based on the reference signal and the microphone signal; updating the reference signal based on the estimated echo path delay; and generating, using the second neural network of the multi-task deep neural network, an enhanced microphone signal based on the microphone signal and the updated reference signal.

In some embodiments, the system further includes a speaker and a microphone, and wherein obtaining a reference signal and a microphone signal comprises: obtaining the reference signal from the speaker; and obtaining the microphone signal from the microphone.

In some embodiments, before generating the estimated echo path delay, the instructions, the instructions, when executed by the one or more processers, further cause the system to perform: concatenating the reference signal and the microphone signal to obtain a concatenated signal; and encoding the concatenated signal to obtain log-magnitude spectra.

In some embodiments, encoding the concatenated signal to obtain log-magnitude spectra comprises: encoding the concatenated signal to obtain log-magnitude spectra by a short-time Fourier transform.

In some embodiments, the updating the reference signal based on the estimated echo path delay comprises: compensating the reference signal based on the estimated echo path delay.

In some embodiments, the first neural network comprises a first convolutional recurrent neural network (CRNN) and a fully-connected (FC) network, and the second neural network comprises a second convolutional recurrent neural network (CRNN), wherein: the first CRNN is trained to estimate echo from the microphone signal based on the reference signal, the FC network is trained to estimate the echo path delay based on echo and the reference signal, and the second CRNN is trained to generate the enhanced microphone signal based on the microphone signal and the reference signal compensated by the echo path delay.

In some embodiments, at least one of the first and the second CRNNs comprises a plurality of two-dimensional (2-D) convolutional layers and a plurality of deconvolutional layers corresponding to the plurality of 2-D convolutional layers.

In some embodiments, the at least one of the first and the second CRNNs further comprises one or more bidirectional long-short term memory (BLSTM) layers between the plurality of 2-D convolutional layers and deconvolutional layers.

In some embodiments, the at least one of the first and the second CRNNs further comprises an exponential linear unit (ELU) as an activation function for each of the plurality of convolutional layers and deconvolutional layers except for the last of the deconvolutional layers.

In some embodiments, the at least one of the first and the second CRNNs further comprises a sigmoid activation function for the last of the deconvolutional layers.

In some embodiments, to estimate an echo path delay based on the echo signal and the reference signal, the FC network is further configured to calculate a cross-correlation between the echo signal and the reference signal.

In some embodiments, the FC network comprises a plurality of dense layers mapping the cross-correlation to a vector, and the vector represents a delay in samples.

Another aspect of the present disclosure is directed to a computer-implemented method for echo path delay estimation and echo cancellation. The method includes: obtaining a reference signal, a microphone signal, and a trained multi-task deep neural network, wherein the multi-task deep neural network comprises a first neural network and a second neural network; generating, using the first neural network of the multi-task deep neural network, an estimated echo path delay based on the reference signal and the microphone signal; updating the reference signal based on the estimated echo path delay; and generating, using the second neural network of the multi-task deep neural network, an enhanced microphone signal based on the microphone signal and the updated reference signal.

Yet another aspect of the present disclosure is directed to a non-transitory computer-readable storage medium coupled to one or more processors and comprising instructions that, when executed by the one or more processors, cause the one or more processors to perform operations including: obtaining a reference signal, a microphone signal, and a trained multi-task deep neural network, wherein the multi-task deep neural network comprises a first neural network and a second neural network; generating, using the first neural network of the multi-task deep neural network, an estimated echo path delay based on the reference signal and the microphone signal; updating the reference signal based on the estimated echo path delay; and generating, using the second neural network of the multi-task deep neural network, an enhanced microphone signal based on the microphone signal and the updated reference signal.

In the disclosure, the methods and systems based on a multi-task deep neural network are provided to address both ref-delay estimation and echo cancellation. A multi-task deep neural network model is built and trained to address problems caused by the inconsistent delays in echo paths. The multi-task deep neural network model includes two convolutional recurrent networks (CRNNs) to estimate the echo and enhanced signals respectively, as well as a fully-connected (FC) network to estimate the echo path delay. According to the embodiments, an echo signal can be first predicted by one of the CRNNs, and then combined with the reference signal to estimate the delay. Delay-compensated reference and microphone signals may be used by the other CRNN to predict the enhanced target signal. In this way, the provided multi-task deep neural network model gains robustness to the inconsistent ref-delays and yields stable echo cancellation performance. Evaluation results suggest that the provided multi-task deep neural network systems and methods can estimate the echo path delay reliably and outperforms the existing related technologies under the criteria of echo return loss enhancement (ERLE) and perceptual evaluation of speech quality (PESQ). Further, the disclosure also provides a data augmentation method used to evaluate the performance of the model on different portions of synthetical data with artificially introduced ref-delay.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Acoustic echo often originates in a local audio loopback that occurs when a microphone picks up audio signals from a speaker, and sends the audio signals back to a far-end participant. Acoustic echo cancellation (AEC) or suppression (AES) methods and systems aim to suppress echo from a microphone signal whilst leaving the speech of near-end talker least distorted. Some echo cancellation algorithms may estimate the echo path by using adaptive filters, with the assumption of a linear relationship between a far-end signal and acoustic echo. In practice, this linear assumption may not always hold, and thus a post-filter is often deployed to suppress the residue echo. With the advancement in deep learning, many of the speech processing tasks, including acoustic echo cancellation, have been done using deep neural networks. For example, a deep neural network with 3 layers of restricted Boltzmann machine (RBM) may be used to predict the gain of residual echo suppression. In other examples, a network of two fully-connected (FC) layers may be used to detect the activity of a near-end signal; a bidirectional long-short term memory (BLSTM) networks may be used to predict the ideal ratio mask from microphone signals; a two-layer network may be built to predict a phase-sensitive filter of the residual echo suppression; convolutional recurrent networks and long-short term memory networks may be used to separate the near-end speech from the microphone recordings; deep recurrent neural networks with multitask learning may be used to learn the auxiliary task of estimating the echo in order to improve the main task of estimating the near-end speech; and a generative adversarial network (GAN) with various metric loss functions may improve model robustness for both linear and nonlinear echoes.

Echo path delay estimation is crucial in echo cancellation, and AEC algorithms cannot work without an accurate delay estimation. A light-computation-load algorithm can be provided to release input correlation and reduce cross-correlation lags. The constant delay may be estimated with the assumption that the input sequence to the adaptive filter can be modeled as an autoregressive (AR) process whose order is much lower than the adaptive filter length. A spectral similarity function may also be deployed based on cepstral correlation to detect acoustic echoes and estimate the echo path delay.

Direction of arrival (DOA) estimation can be similar to echo path delay estimation, which detects the source locations by estimating the time delay between microphones. Typically, the phase spectra are used as an input for the deep learning models. However, deep neural network (DNN) methods in DOA estimation cannot be applied to ref-delay estimation directly, as echo path delay can be much larger than that in DOA tasks, and thus delay information may not be well kept in the phase spectra.

In this disclosure, a multi-task deep neural network model is provided to estimate echo path delay and perform echo cancellation simultaneously. The model may include three subnets: two convolutional recurrent neural networks (CRNNs) and one fully-connected (FC) network. The two CRNNs predict echo and target signals separately, and the FC network estimates an echo path delay. The multi-task deep neural network model takes reference and microphone waveforms as inputs and predicts an enhanced waveform as well as ref-delay as the outputs.

Figure 1:
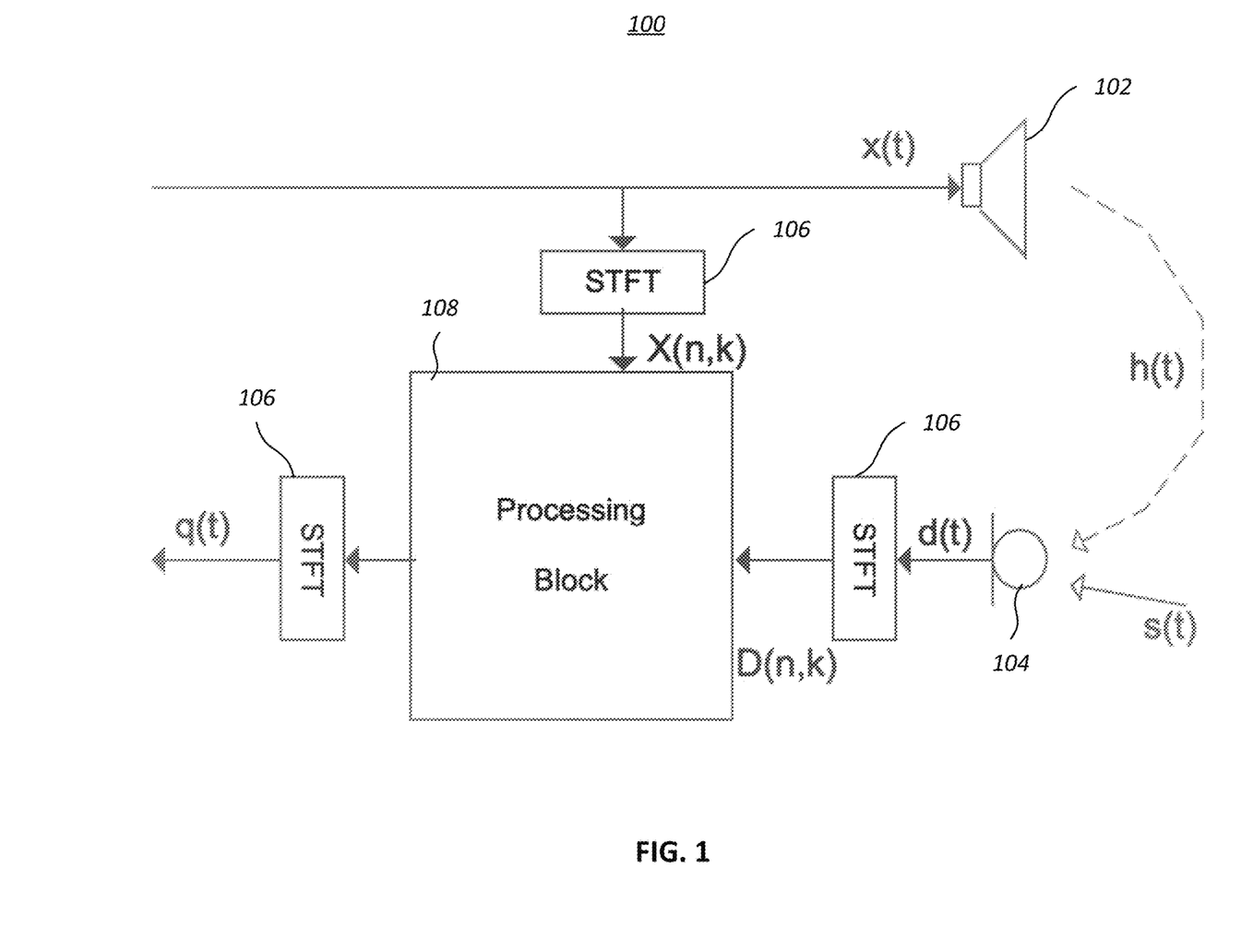
FIG. 1 is a block diagram illustrating a system for echo generation and cancellation, in accordance with various embodiments.

FIG. 1 is a block diagram of a system 100 for echo generation and echo cancellation, in accordance with various embodiments of the disclosure. The system 100 may be equipped on a user device, e.g., a mobile phone, a tablet, a desktop computer, a wearable device (smartwatch), etc. In some embodiments, the system 100 may be incorporated in a vehicle to enable a better user experience of phone conversations between drivers while driving vehicles. In the illustrated embodiments, the system 100 of FIG. 1 may be a part or the whole of a speech communication system 100, an AEC or AES system 100, or a multi-task system 100 for echo path delay estimation and echo cancellation. The system 100 of FIG. 1 includes a speaker 102, a microphone 104, three short-time Fourier transform (STFT) modules 106, and a processing block 108. Although only one speaker 102, one microphone 104, three STFT modules 106, and one processing block 108 are illustrated, different numbers of these components of the system 100 may be included in other embodiments.

As illustrated in FIG. 1, acoustic echo may be generated by the coupling of the microphone 104 and the speaker 102. For example, a far-end signal (or reference signal) $x(t)$ propagates from the speaker 102 and through various reflection paths $h(t)$, and mixes with a near-end signal $s(t)$ to form a microphone signal $d(t)$. The microphone signal $d(t)$ refers to the signal received by the microphone 104 of the system 100, and may be represented by the following equation (1):

$$d(t)=h(t)*x(t)+s(t)+n(t) \qquad (1)$$

where $n(t)$ represents a background noise signal. An acoustic echo may be a modified version of $x(t)$ and includes echo paths $h(t)$ and speaker distortion.

In the illustrated embodiments of FIG. 1, the reference signal $x(t)$ and the microphone signal $d(t)$ may be encoded by the short-time Fourier transform (STFT). The processing block 108 may take the transformed reference signal $X(n, k)$ and microphone signal $D(n, k)$ as inputs, perform echo cancellation and output an enhanced microphone signal $q(t)$.

In some embodiments, the processing block 108 may include AEC algorithms which use adaptive filters to estimate the echo paths $h(t)$ to obtain estimated echo paths $h^*(t)$, and subtract the estimated echo $y(t)=h^*(t)*x(t)$ from microphone signal $d(t)$. A separate double-talk detection may be required to freeze filter adaption during a double talk period. A post-filter may be added to further suppress the residue echo. Alternatively, deep learning-based AEC algorithms may be applied to find a mapping from an input (e.g., an echo corrupted signal) to an output (e.g., a target signal). With sufficient training data, neural network-based solutions yield better performance than non-deep learning-based ones in both matched and unmatched data sets. For consistent ref-delay, both non-deep learning methods and deep learning methods perform well. But in practice, echo path delays can be very different. For example, phones, iPads, PCs, and other electronic devices all generate different ref-delays. Therefore, non-deep learning methods often need to add a delay estimation component before the AEC component. For deep learning-based methods, recordings collected from different devices may have different ref-delays. In some situations, the variations between the ref-delays may be large. Thus, training data sets covering as many delay versions as possible may be required to prevent mismatches in data sets.

Figure 2:
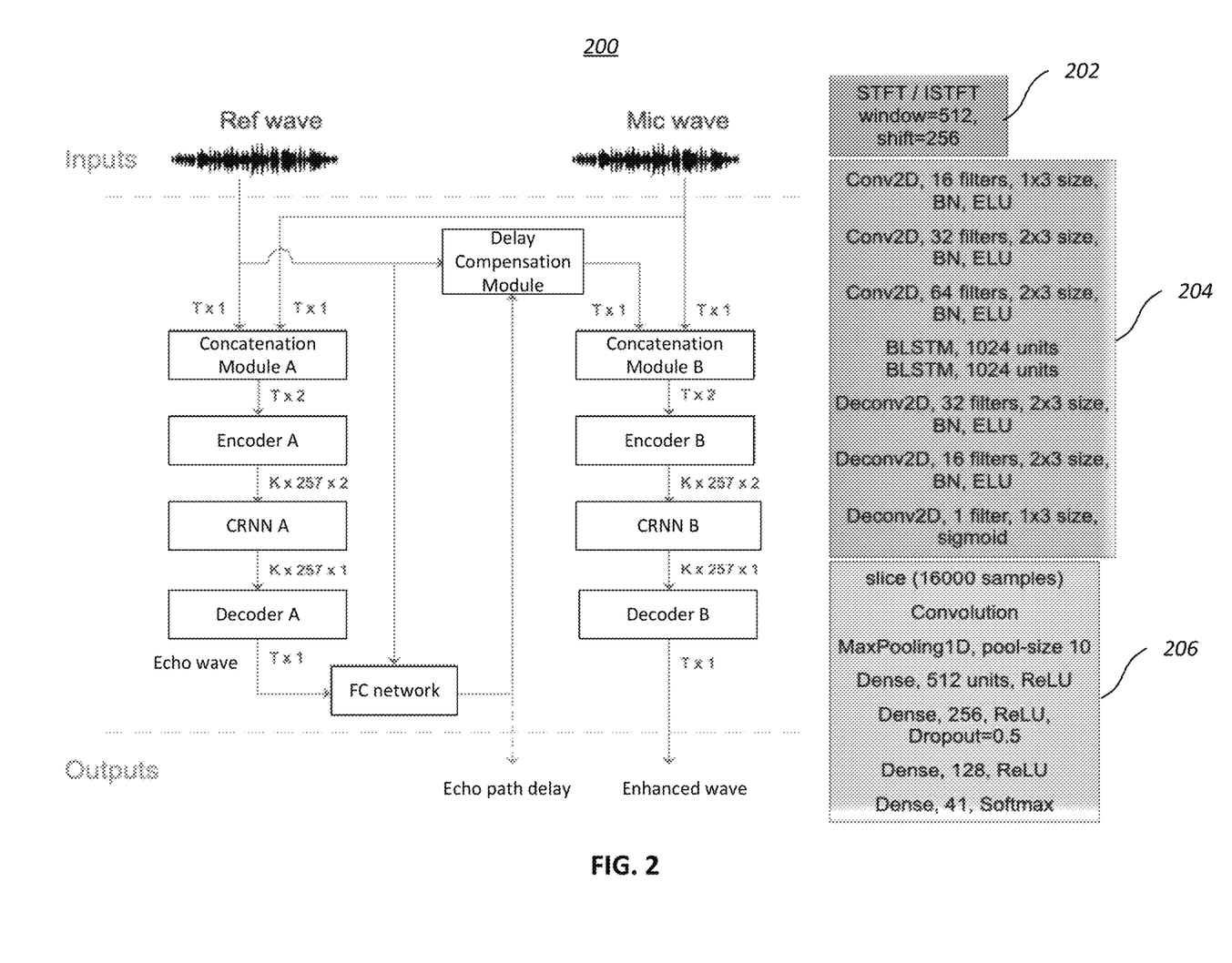
FIG. 2 is a block diagram illustrating a structure of a multi-task deep neural network system for echo path delay estimation and echo cancellation, in accordance with various embodiments.

The disclosure provides a multi-task deep neural network 200 trained to perform both the echo path delay estimation and echo cancellation. FIG. 2 is a block diagram illustrating a structure of the multi-task deep neural network system 200 in accordance with various embodiments. The training process of the multi-task deep neural network 200 may jointly train its trainable components. As shown in FIG. 2, the multi-task deep neural network system 200 includes two convolutional recurrent neural networks (CRNNs) (represented by CRNN A and CRNN B), a fully-connected network (represented by FC network), as well as two encoders (represented by Encoder A, Encoder B) and two decoders (represented by Decoder A, Decoder B) before and after the two CRNNs respectively. As illustrated, the multi-task deep neural network system 200 may also include two concatenation modules (represented by Concatenation module A, Concatenation module B) before the two encoders respectively, and a delay compensation module before the Concatenation module B and after the FC network. Although only two CRNNs, two encoders, two decoders, and one FC network is included in the system 200 as illustrated in FIG. 2, in other embodiments, different numbers of CRNNs, encoders, decoders, FC networks may be included in the multi-task deep neural network system 200.

In some embodiments, the multi-task deep neural network system 200 includes one or more processors and memory storing instructions that, when executed by the one or more processors, cause the system to perform the functionalities described hereinafter. For example, the instructions, when executed by the one or more processors, cause the system 200 to perform concatenating input sound waveforms (also referred to sound signals, may include a reference signal and a microphone signal), encoding and decoding the sound signals, estimating echo path delay, updating (by compensating) the sound signals based on the delay, canceling echo signals, obtaining enhanced signals, and other functionalities of the concatenate modules, encoders, CRNNs, decoders, FC network, delay compensation module, etc.

The multi-task deep neural network system 200 may take microphone and reference waveforms (also referred to as microphone and reference signals) as inputs, and predict delay and enhanced waveforms as outputs. In some embodiments, an input waveform may have a dimension T×1, where T is the number of waveform samples.

As illustrated in FIG. 2, input waveforms may be fed into a respective encoder. For example, a reference waveform (also referred to as a reference signal) may be first fed into the Encoder A. An encoder may be a short-time Fourier transform (STFT) or an inverse STFT (ISTFT) with a window length of 512 points and a shift of 256 points for a 16000 Hz sampling rate, as shown in block 202. An output of the encoder may be log-magnitude spectra with a dimension of K x 257×2, where K is the number of frames. For example, Encoder A and Encoder B are both STFT with a window length of 512 points and a shift of 256 points for the 16000 Hz sampling rate. In other examples, the Encoder A and Encoder B may be other transforms or STFT with other configurations.

In some embodiments, the multi-task network system 200 may also include two concatenation modules (e.g., Concatenation module A, Concatenation module B). Each concatenation module may be configured to concatenate two input signals into a concatenated signal. For example, two signals with a dimension T×1 may be inputted into a concatenation module to output a concatenated signal with a dimension T×2. In FIG. 2, Concatenation module A may concatenate the reference signal and the microphone signal to obtain a concatenated signal based on these two signals. Concatenation module B may take the reference signal compensated with an echo path delay as an input and the microphone signal as another input to obtain a concatenated signal based on the compensated reference signal and the microphone signal. Here, the "reference signal compensated with an echo path delay" may be referred to an updated reference signal. In some embodiments, the concatenated signals may be inputted to the encoders respectively.

In the embodiments of FIG. 2, the CRNN A may be trained to estimate echo waveforms from the microphone waveforms; while the CRNN B may be trained estimate enhanced microphone waveforms based on delay-compensated reference waveforms and the microphone waveforms. As illustrated in block 204, each of the CRNN A and CRNN B may include three two-dimensional (2-D) convolutional layers and three corresponding deconvolutional layers. Convolutions may enforce a network to focus on temporally-close correlations in an input signal. Between the convolutional and deconvolutional layers, each CRNN may include two BLSTM layers to capture extra temporal information. In addition, the CRNN may include a component—Batch normalization (BN)—applied after each convolutional layer and deconvolutional layer except for the last deconvolutional layer. Further, each CRNN may include an exponential linear unit (ELU) used as an activation function for each convolutional layer and deconvolutional layer except for the last deconvolutional layer. That is, an ELU is used as an activation function for each of the three convolutional layers and for each of the first two deconvolutional layers. For the last deconvolutional layer, each CRNN may use a sigmoid activation function to predict time-frequency (T-F) masks.

In some embodiments, the number of the components in each CRNN, e.g., the convolutional layer, the deconvolutional layer, the BLSTM, etc., may be different from those illustrated in FIG. 2. For example, a CRNN may include more than three convolutional layers and corresponding deconvolutional layers. In other examples, a CRNN may include more than two BLSTM layers. In some embodiments, the CRNN A and the CRNN B may have an identical structure including, e.g., the same number and same types of components as described above. In other embodiments, the CRNN A and the CRNN B may have different structures including different numbers and types of components. In some embodiments, the CRNNs may feature skip connections, connecting each convolutional and corresponding deconvolutional layers. For example, the CRNNs skip some layers in the network and feed the output of one layer as an input to the next layers instead of the immediate next one. In this way, the fine-grained information of the input spectra can be passed to the subsequent layers.

The decoders may transform the spectra back to waveforms or signals in the time domain. For example, the decoders may be inverse STFT with the same parameters as the respective encoders. The output of Decoder A may be an estimated echo waveform. As shown in FIG. 2, the estimated echo waveform, combined with the reference waveform, is fed into the FC network. The FC network may be trained to predict the ref-delay based on the cross-correlation between the echo and reference signals. For example, the beginning 16,000 samples from each waveform may be used to calculate the cross-correlation. A different number of samples may be chosen in practice. If the segment of samples used to calculate the cross-correlation is too small, correlation with the existence of various room impulse responses (RIRs) may not be demonstrated; if the segment of samples used to calculate the cross-correlation is too large, empirical data shows no further improvement. Therefore, a segment of around 16,000 samples may be the most suitable to represent the cross-correlation between the echo and reference signals, as well as provide an improvement on estimation. In other embodiments, 15,000 or 20,000 samples may be used.

In some embodiments, the cross-correlation size may then be reduced by maxpooling before entering a dense layer of the FC network. Too large input size may degrade the accuracy of the delay signal prediction. Although the delay estimation resolution may be declined by 10 due to the maxpooling, the CRNNs are robust to handle the small variance. For example, the CRNNs yield close results for ref-delay=10 and 19 samples (since both will be categorized as 10 because of maxpooling). As illustrated in block 206 in FIG. 2, the FC network may include three dense layers. The three dense layers may be configured to map the cross-correlation input to a one-hot-vector output, where each spot represents a delay in samples. In some embodiments, an output of the FC network may be a vector with a size of 41. The size of the vector may be changed according to different applications to 30, 40, 50, 60, etc. Each element in the output vector may represent a probability of delay at each time. For example, if a time interval of the neighbor samples is set to 10 milliseconds (ms), the elements of the vector represent probabilities of delay at time intervals of 10, 20, 30, 40, . . . ms. In some embodiments, the highest probability of delay may be chosen from the vector and the time corresponding to the highest probability of delay may be determined as the time of delay. The time of delay may also be translated into the number of samples.

In some embodiments, the RIRs may be collected from real environments, which have different shapes and peak locations (corresponding to direct paths). Hence, the existence of RIRs makes the delay estimation more challenging. The FC network shows more robustness than an "argmax" function. Furthermore, the ref-delay is generally much larger than that between microphones in DOA tasks, and thus phase spectra do not provide sufficient information for ref-delay estimation.

As shown in FIG. 2, the system 200 may include a delay compensation module where the estimated delay may be used to compensate the reference signal. The CRNN B may take the microphone and delay-compensated reference signal as inputs, and predict the enhanced target signal. With the delay compensation, the CRNN B may remove the delay effect and focus mainly on the RIR estimation, leading to better echo suppression and less target distortion.

Examples of the major model parameters are also shown in blocks 202, 204, 206 in FIG. 2. In each CRNN, the number of feature maps for convolutional layers may be set to: 16, 32, and 64. The kernel size used for the first layer is (1, 3) and for the remaining layers is (2, 3), with strides set to (1, 2). The BLSTM layers may include 2048 neurons, with 1024 in each direction and a time step of 100. In the FC network, convolution may be conducted by the function "tf.nn.convolution" in TensorFlow. Three hidden (dense) layers may have 512, 256, and 128 units, with a rectified linear unit (ReLU) as the activation function. A dropout layer may follow after the second dense layer in order to prevent overfitting. The output layer may have 41 units with a Softmax activation function, indicating categories of ref-delay=0, 10, . . . , 400.

In some embodiments, the multi-task deep neural network or its component models may be trained using Adam optimizer for 100 epochs with a learning rate of 0.0002 and a batch size of 1. That is, the component models of the multi-task deep neural network are jointly trained. The time step changes with the number of frames per sentence. The loss function for the enhanced output may mean square error (MSE), and that of delay estimation is categorical cross-entropy, with a loss weight=[1, 1]. The loss functions may be based on utterance level. Furthermore, synthetical data may be generated by introducing delay into time aligned recordings. For example, a training dataset may be formed that 20% of the training dataset is synthetical samples. The training dataset allows the models to learn delay prediction. Due to the imbalanced categories of ref-delays (e.g., 80% ref-delay=0), the categorical cross-entropy is replaced with a focal loss as the loss function. Loss weight remains unchanged from above.

General metrics for AEC performance evaluation includes echo return loss enhancement (ERLE) and perceptual evaluation of speech quality (PESQ). ERLE may be used to measure the echo reduction achieved by the system during single-talk situations where a near-end talker is inactive. ERLE is defined as the following:

$$ERLE(\text{dB}) = 10\log_{10}\frac{E\{d^2(t)\}}{E\{q^2(t)\}} \quad (1)$$

where E{ } represents the statistical expectation.

PESQ evaluates the perceptual quality of enhanced speech during double talk. PESQ score is calculated by comparing the enhanced signal to the ground-truth signal, where the PESQ score ranges from −0.5 to 4.5 or higher indicate better quality.

In some embodiments, TIMIT, a corpus of phonemically and lexically transcribed speech of American English speakers of different sexes and dialects, is used to generate a dataset to evaluate the echo cancellation performance. The TIMIT includes speech recorded at Texas Instruments (TI) and transcribed at the Massachusetts Institute of Technology. For example, a dataset may be built by randomly choosing 100 pairs of speakers (e.g., 40 male-female, 30 male-male, 30 female-female) from 630 speakers of TIMIT as the far-end and near-end speakers. Three utterances of the same far-end speaker were randomly chosen and concatenated to create a far-end signal. Each utterance of a near-end speaker was then extended to the same size as that of the far-end signal by zero paddings in the rear. Seven utterances of near-end speakers were used to generate 3500 training mixtures where each near-end signal was mixed with five different far-end signals. From the remaining 430 speakers, another 100 pairs of speakers were randomly picked as the far-end and near-end speakers. In other examples, the same procedure as described above may be followed, but only three utterances of near-end speakers were used to generate 300 testing mixtures where each near-end signal was mixed with one far-end signal. Therefore, the testing mixtures were from untrained speakers.

Four real environmental recorded RIRs from Real World Computing Partnership (RWCP) Sound Scene database may be used to generate acoustic echoes. Table 1 shows the information of the four RIRs E1A, E1B, E1C, and E2A. In Table 1, a value of RT60 in second is shown for each RIR, where RT60 is a measure of how long sound takes to decay by 60 dB in a space that has a diffuse sound-field, e.g., a room large enough that reflections from the source reach the microphone from all directions at the same level.

TABLE 1

| RIRs from RWCP database | | | | |
|---|---|---|---|---|
| RIRs | E1A | E1B | E1C | E2A |
| RT60 (in second) | 0.12 | 0.31 | 0.38 | 0.30 |

In some embodiments, linear echo scenarios are considered. In the training stage, the microphone signals are generated randomly at signal to echo ratio (SER) {−6, −3, 0, 3, 6} dB, where SER is defined as $$SER(\text{dB}) = 10\log_{10}\frac{E\{\text{signal}^2_{near}\}}{E\{\text{signal}^2_{far}\}} \quad (2)$$

In the test stage, the microphone signals are generated at SER levels {0, 3.5, 7} dB, slightly different from the training SERs, in order to evaluate the unmatched training-test datasets.

The echo signal may be simulated by convolving RIRs with far-end signals. Delay may be randomly generated in a range [0, Dmax], where Dmax is the upper limit for the ref-delay. For example, it can be set that Dmax=400 samples. The echo signal is then delayed and mixed with near-end signal under the SERs.

In some embodiments, two echo cancellation algorithms, echo cancellation & delay estimation (EC-DE) method and one CRNN-based method are deployed as the benchmark. EC-DE is a signal processing method adopting cross-correlation for delay estimation and linear adaptive filters for echo cancellation. The one CRNN-based method is a deep learning-based method and may include one CRNN identical to a CRNN in the provided multi-task deep neural network method of the disclosure.

The multi-task deep neural network method may be evaluated on the delay estimation task in "simple-delay" and "RIR" scenarios. In the "simple-delay" scenario, the microphone signal is simply a delayed version of reference signal. In other words, the room impulse response is a Dirac delta function. In the "RIR" scenario, RIRs from the RWCP Sound Scene database are used to generate the microphone signals. Further, during evaluation, a near-end signal is assumed to be inactive, and the microphone signal may be obtained by convolving reference with a room impulse response. Furthermore, the delay may be randomly generated between [0, Dmax]. Dmax may be any value chosen based on practice. Multiple (e.g., five) room impulse responses may be obtained from the RWCP dataset, which have different RT60, as well as different peak locations. The RIRs may or may not be time-aligned in simulating echo signals.

Figure 3:
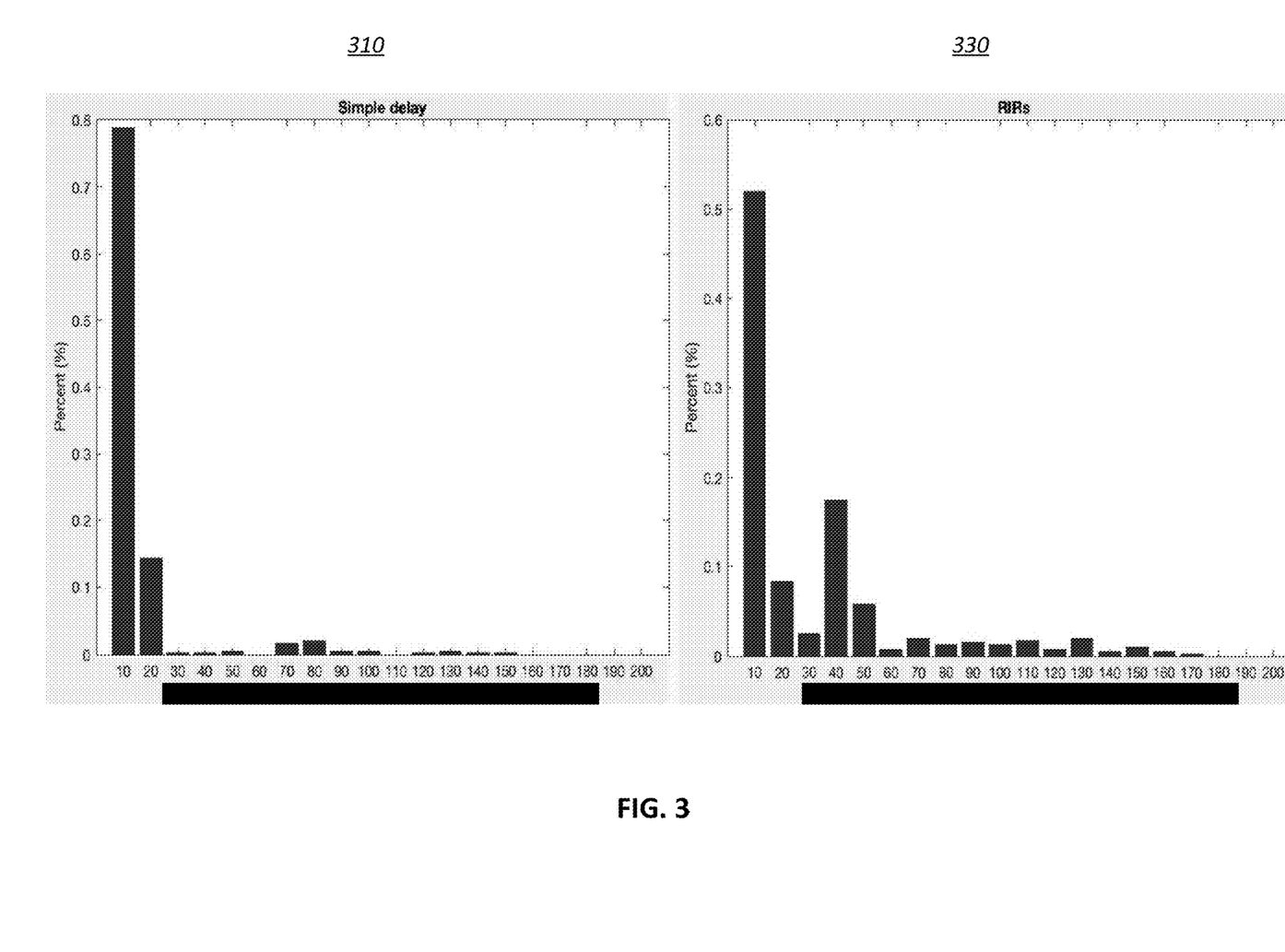
FIG. 3 shows delay estimation results in "simple delay" and "RIR" scenarios, in accordance with various embodiments.

FIG. 3 shows delay estimation results 310, 330 in "simple delay" and "RIR" scenarios, in accordance with various embodiments. For example, the delay estimation results 310, 330 in the "simple delay" and "RIR" scenarios on 600 sentences with an SER of 0 dB are shown. In FIG. 3, the x-axis in both results 310, 330 represents the difference between true and estimated delays in samples, and the y-axis in both results 310, 330 represents the percentage for each difference. In the result for the "simple delay" scenario 310, 80% of the delay estimation difference (e.g., the difference between the true and estimated delays) is less than 10 samples. Accuracy of the delay estimation result in the "RIR" scenario 330 is a bit lower than that in the "simple delay" scenario, but still over 50% of the true and estimated delay difference is less than 10 samples. These results show that the provided multi-task deep neural network method can effectively reduce the ref-delay variance by compensating the ref-delay, and contribute significantly to the echo cancellation performance.

The echo cancellation performance of the multi-task deep neural network method and two benchmark methods may also be evaluated. Two datasets "set-A" and "set-B" are generated. Echo signals are first obtained by convolving reference with RIRs. In "set-A," the echo signal is directly added to near-end signals to simulate microphone signals for each training (train-A) and test (test-A) mixture. In "set-B," the echo signal is randomly delayed between [0, Dmax] and then added to near-end signal for each training (train-B) and test (test-B) mixture. The PESQ and ERLE scores are shown in Table 2, which are averaged along different SERs. Dmax does not apply to EC-DE method since EC-DE method may not have a training process.

As shown in Table 2, the one CRNN-based method yields good PESQ and ERLE scores in the matched cases (e.g., train-A & test-A, or train-B & test-B). However, its performance drops in the mismatched cases. For example, the one CRNN-based method yields a PESQ score 2.35 for train-A & test-B, compared to 2.70 for train-A & test-A scenario, and the ERLE score decreases by 12.1 dB (from 47.5 to 35.4). The provided multi-task deep neural network method shows a slight improvement in train-A & test-B case, since the delay prediction model learns nothing from training and thus cannot contribute to the performance; while the provided method yields better PESQ and ERLE scores than the one CRNN-based method when training with set-B. Further, the multi-task deep neural network method yields similar PESQ and ERLE scores for both matched and mismatched scenarios. In contrast, PESQ score of the one CRNN-based method drops from 2.65 in matched case (train-B & test-B) to 2.43 in mismatched case, and ERLE score drops from 49.1 to 47.4. The results prove that according to multi-task deep neural network, the delay prediction model compensates the delay and thus releases the mismatch effect. EC-DE is robust to the delay since it has a delay estimation component, but its PESQ and ERLE scores are lower than the multi-task deep neural network methods as well.

TABLE 2

PESQ and ERLE scores for train/test mismatch

|  |  | Train-A | | Train-B | |
| --- | --- | --- | --- | --- | --- |
|  | Train/Test | Test-A | Test-B | Test-A | Test-B |
| PESQ | EC-DE | 2.66 | 2.60 | 2.66 | 2.60 |
|  | One CRNN | 2.70 | 2.35 | 2.43 | 2.65 |
|  | Multi-task | 2.72 | 2.38 | 2.70 | 2.75 |
| ERLE (dB) | EC-DE | 32.3 | 31.1 | 32.3 | 31.1 |
|  | One CRNN | 47.5 | 35.4 | 47.4 | 49.1 |
|  | Multi-task | 48.0 | 35.9 | 50.4 | 50.9 |

Data augmentation may provide the diversity of delay for training models, without actually collecting new data. In some embodiments, the training datasets may be extended from "set-A". Synthetical data may be generated by introducing random delay between [0, Dmax] into "set-A" data. A new training set may be formed, where 20% or 50% of the new training set is synthetical data. For "set-B" in above section, each ref-delay category (0, 1, . . . 400) holds roughly 1/401 of the total amount of data. However, if 20% of the training set is synthetical data, the category of ref-delay=0 has 80% of the training data, and other ref-delay categories each has 0.05%. The imbalanced category issue may severely degrade the model performance. Hence, a focal loss function may replace the cross-entropy in the model.

Table 3 shows the PESQ and ERLE scores where 20% and 50% portion of the training set is synthetical data. In Table 3, the training portion=0% is identical to "train-A", and the training portion=100% is identical to "train-B" in section B.

TABLE 3

PESQ and ERLE scores for an augmented dataset

|  |  | PESQ | | ERLE (dB) | |
| --- | --- | --- | --- | --- | --- |
| Training Portion | Test set | One CRNN-based method | Multi-task deep neural network method | One CRNN-based method | Multi-task deep neural network method |
| 0% | Test-A | 2.70 | 2.72 | 47.5 | 48.0 |
|  | Test-B | 2.35 | 2.38 | 35.4 | 35.9 |
| 20% | Test-A | 2.68 | 2.71 | 46.2 | 49.3 |
|  | Test-B | 2.42 | 2.68 | 37.1 | 48.9 |
| 50% | Test-A | 2.62 | 2.67 | 45.8 | 51.0 |
|  | Test-B | 2.46 | 2.71 | 42.0 | 50.7 |
| 100% | Test-A | 2.43 | 2.70 | 47.4 | 50.4 |
|  | Test-B | 2.65 | 2.75 | 49.1 | 50.9 |

With the portion of synthetical data increasing, the one CRNN-based method yields a smaller difference of PESQ and ERLE scores between match/mismatch scenarios. The multi-task deep neural network method obtains very similar scores for "test-A" and "test-B" over all the scenarios except for portion=0%, indicating that 20% of augmented data is sufficient for a delay estimation model. The provided multi-task deep neural network method achieves a 0.26 PESQ and 11.8 dB ERLE improvement when 20% of the training set is synthetical data ("test-B"), and 0.25 PESQ and 8.7 dB ERLE improvement for 50% portion case ("test-B") over the one CRNN-based method. Overall, the multi-task deep neural network method shows better robustness than the one CRNN-based method to the inconsistent delay.

Figure 4:
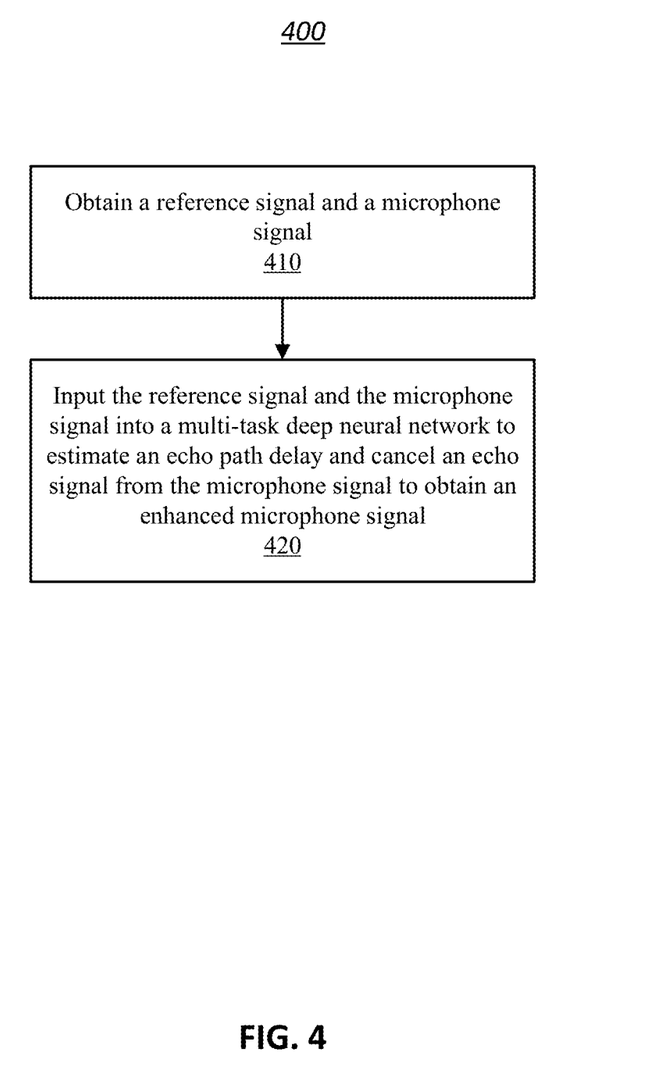
FIG. 4 is a flowchart illustrating a method for echo path delay estimation and echo cancellation, in accordance with various embodiments.

FIG. 4 is a flowchart illustrating a method 400 for echo path delay estimation and echo cancellation, in accordance with various embodiments. The method 400 may be implemented in various systems or devices including one or more processors and memories, for example, in the system of FIG. 2. The operations of the method 400 presented below are intended to be illustrative. Depending on the implementation, the method 400 may include additional, fewer, or alternative steps performed in various orders or in parallel.

With respect to the method 400 in FIG. 4, at block 410, a reference signal and a microphone signal may be obtained. For example, the reference signal is obtained from a speaker and the microphone signal is obtained from a microphone. At block 420, the reference signal and the microphone signal may be inputted into a multi-task deep neural network to estimate an echo path delay and cancel an echo signal from the microphone signal (based on the estimated echo path delay) to obtain an enhanced microphone signal.

Figure 5A:
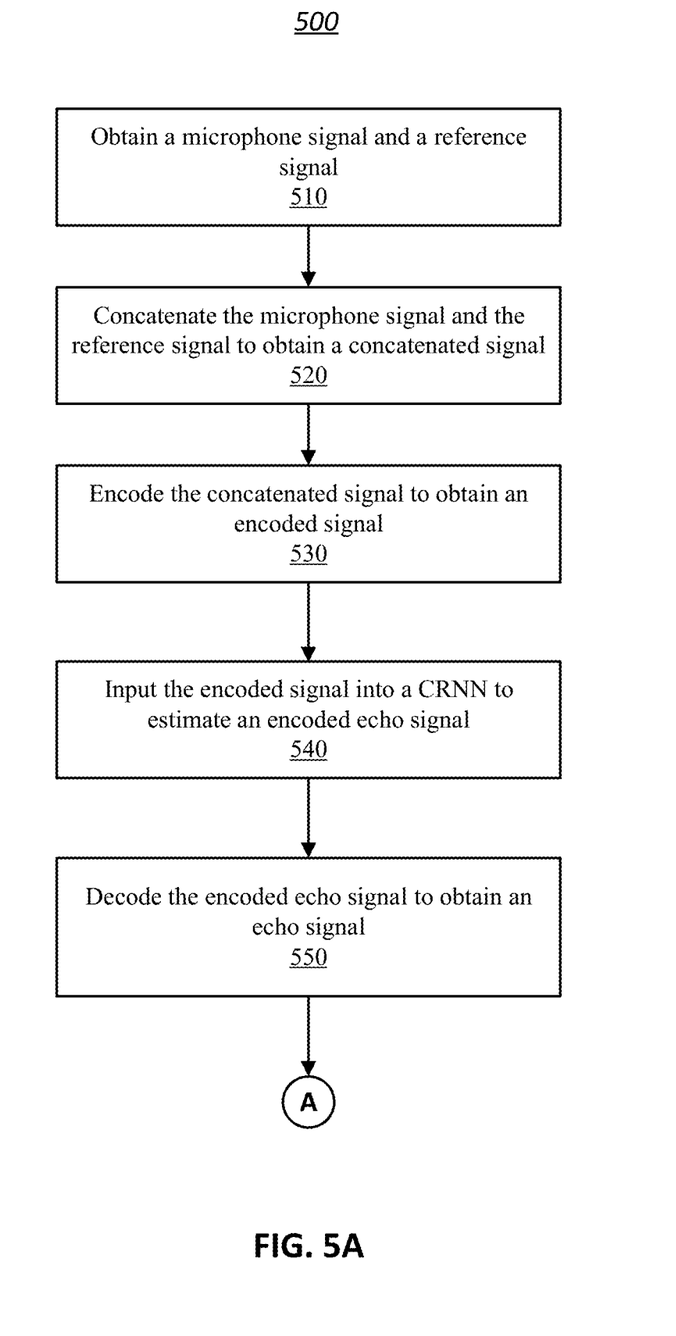
FIGS. 5A and 5B are flowcharts illustrating another method for echo path delay estimation and echo cancellation, in accordance with various embodiments.
Figure 5B:
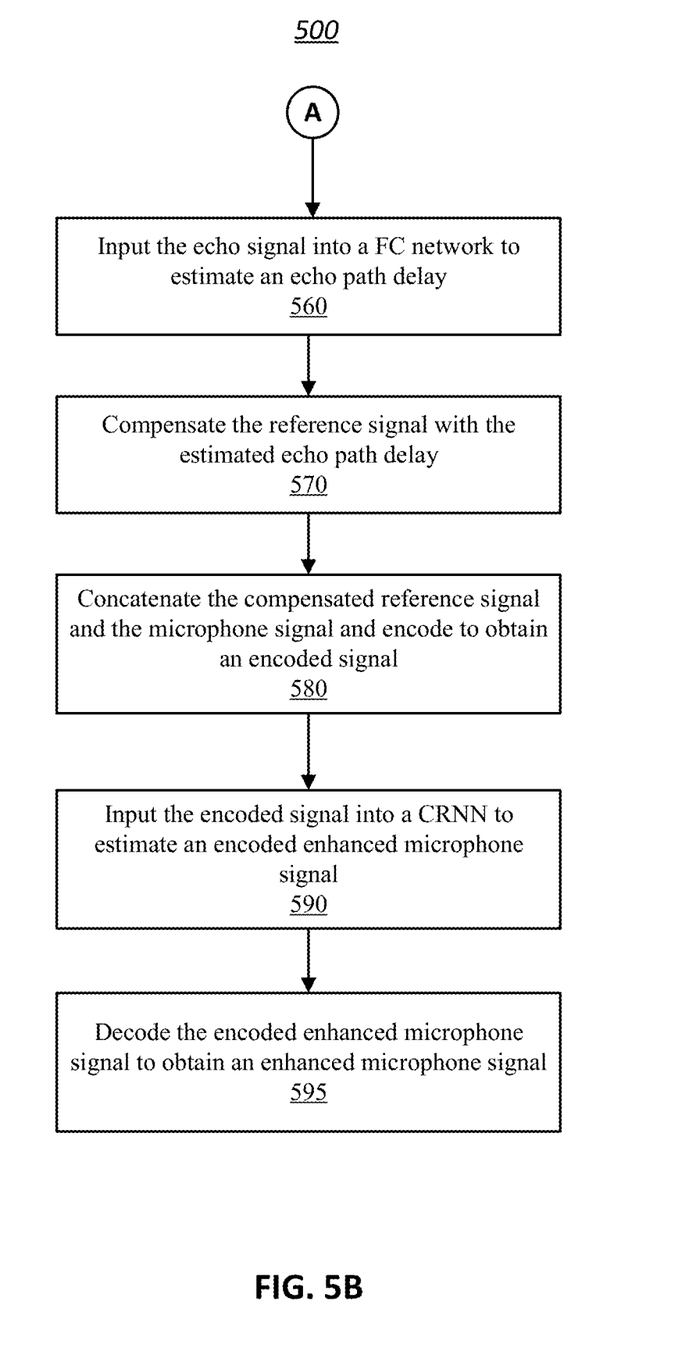

FIGS. 5A and 5B are flowcharts illustrating another method 500 for echo path delay estimation and echo cancellation, in accordance with various embodiments. The method 500 may be implemented in various systems or devices including one or more processors and memories, for example, in the system of FIG. 2. The operations of the method 500 presented below are intended to be illustrative. Depending on the implementation, the method 500 may include additional, fewer, or alternative steps performed in various orders or in parallel.

With respect to the method 500 in FIGS. 5A and 5B, at block 510, similar to the method 400, a reference signal and a microphone signal may be obtained. At block 520, the microphone signal and the reference signal may be concatenated to obtain a concatenated signal. At 530, the concatenated signal may be encoded to obtain an encoded signal. For example, the concatenated signal in time domain may be encoded to log-magnitude spectra by a short-time Fourier transform. At 540, the encoded signal may be inputted into a CRNN to estimate an encoded echo signal. For example, the CRNN includes multiple convolutional and deconvolutional layers, as well as multiple bidirectional long-short term memory (BLSTM) layers between the convolutional and deconvolutional layers. The CRNN is built and trained to estimate an echo signal in spectrum based on the input. At 550, the encoded echo signal may be decoded to obtain an echo signal.

At block 560, the echo signal may be inputted into a FC network to estimate an echo path delay. For example, the FC network is trained to calculate a cross-correlation between the echo signal and the reference signal, and map the cross-correlation to a vector which indicates probabilities of delay at different time intervals. The echo path delay may be determined based on the probabilities of delay in the vector. At block 570, the reference signal may be compensated with the estimated echo path delay. At block 580, the compensated reference signal and the microphone signal may be concatenated and encoded to obtain an encoded signal. At block 590, the encoded signal into a CRNN may be inputted to estimate an encoded enhanced microphone signal. For example, the CRNN may have identical structure as the CRNN at block 540, but be trained using different training signal data to estimate enhanced microphone signal, instead of an echo signal. At block 595, the encoded enhanced microphone signal may be decoded to obtain an enhanced microphone signal.

Figure 6:
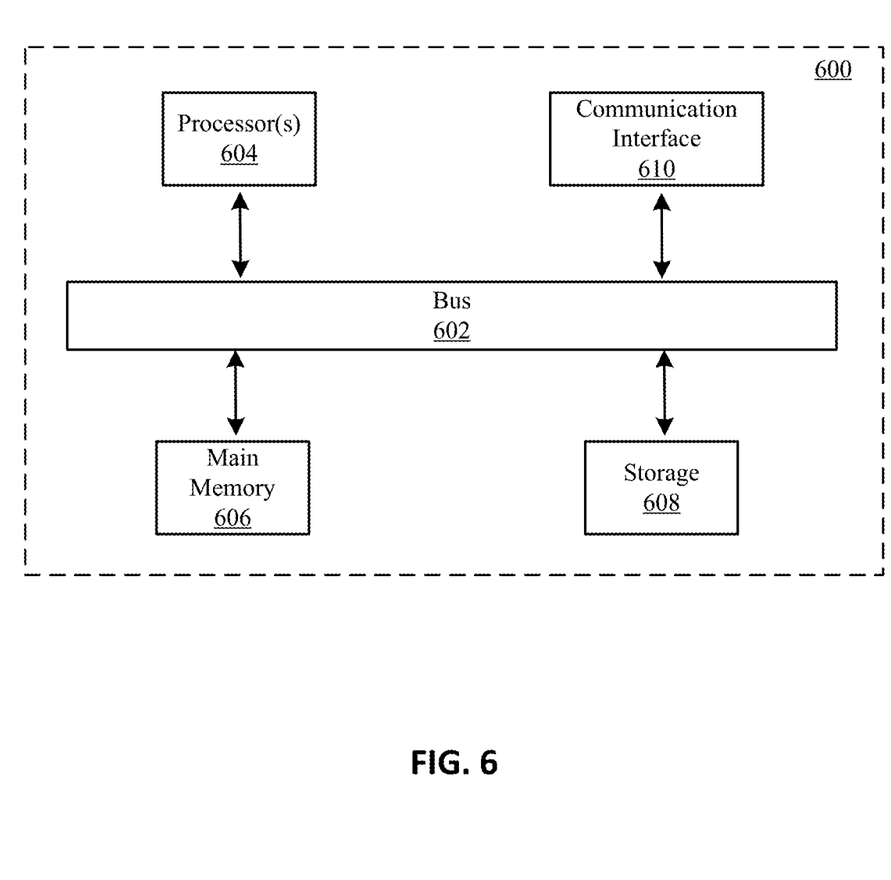
FIG. 6 is a block diagram that illustrates an exemplary computer system in which any of the embodiments described herein may be implemented.

FIG. 6 is a block diagram that illustrates a computer system 600 upon which any of the embodiments described herein may be implemented. For example, the system and or network as described above with reference to FIG. 1 and FIG. 2 may be implemented by the computer system 600. In another example, the methods illustrated in FIG. 4 and FIGS. 5A-5B for echo path delay estimation and echo cancellation may be implemented by the computer system 600. The computer system 600 may include a bus 602 or other communication mechanisms for communicating information, one or more hardware processors 604 coupled with bus 602 for processing information. Hardware processor(s) 604 may be, for example, one or more general-purpose microprocessors.

The computer system 600 also may include a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. In alternative embodiments, hard-wired circuitry may be used in place of or in combination with software instructions.

The computer system 600 also may include a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The computer system 600 may be used to implement the embodiments of the present disclosure. For example, the methods, modules, units, blocks, etc. as described above may be implemented as software (i.e., instructions) that is stored in the memory 606 and/or storage 608. When the instructions are executed by the processor 604, the computer system 600 performs the methods. Alternatively, the methods, modules, units, blocks, etc. as described above may be implemented using customized hard-wired logic, ASICs, FPGAs, and/or firmware in the computer system 600.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The flowcharts described in this paper illustrate modules (and potentially decision points) organized in a fashion that is conducive to understanding. It should be recognized, however, that the modules may be reorganized for parallel execution, reordering, modification (change, remove, or augment), where circumstances permit.

What is claimed is:

1. A system for echo cancellation, comprising:
one or more processors; and
a memory storing instructions that, when executed by the one or more processors, cause the system to perform:
obtaining a reference signal, a microphone signal, and a trained multi-task deep neural network, wherein the multi-task deep neural network comprises a first neural network and a second neural network;
generating, using the first neural network of the multi-task deep neural network, an estimated echo path delay based on the reference signal and the microphone signal, wherein the first neural network comprises a first convolutional recurrent neural network (CRNN) and a fully-connected (FC) network, the first CRNN is trained to estimate echo from the microphone signal based on the reference signal, and the FC network is trained to estimate an echo path delay based on the estimated echo and the reference signal;
updating the reference signal based on the estimated echo path delay; and
generating, using the second neural network of the multi-task deep neural network, an enhanced microphone signal based on the microphone signal and the updated reference signal compensated by the estimated echo path delay.

2. The system of claim 1, further comprising a speaker and a microphone, wherein the obtaining a reference signal and a microphone signal comprises:
obtaining the reference signal from the speaker; and
obtaining the microphone signal from the microphone.

3. The system of claim 1, wherein before generating the estimated echo path delay, the instructions, when executed by the one or more processors, further cause the system to perform:
concatenating the reference signal and the microphone signal to obtain a concatenated signal; and
encoding the concatenated signal to obtain log-magnitude spectra.

4. The system of claim 3, wherein encoding the concatenated signal comprises:
encoding the concatenated signal to obtain log-magnitude spectra by a short-time Fourier transform.

5. The system of claim 1, wherein the updating the reference signal based on the estimated echo path delay comprises:
compensating the reference signal based on the estimated echo path delay.

6. The system of claim 1, wherein the second neural network comprises a second convolutional recurrent neural network (CRNN).

7. The system of claim 6, wherein at least one of the first and the second CRNNs comprises a plurality of two-dimensional (2-D) convolutional layers and a plurality of deconvolutional layers corresponding to the plurality of 2-D convolutional layers.

8. The system of claim 7, wherein the at least one of the first and the second CRNNs further comprises one or more bidirectional long-short term memory (BLSTM) layers between the plurality of 2-D convolutional layers and deconvolutional layers.

9. The system of claim 7, wherein the at least one of the first and the second CRNNs further comprises an exponential linear unit (ELU) as an activation function for each of the plurality of convolutional layers and deconvolutional layers except for the last of the deconvolutional layers.

10. The system of claim 9, wherein the at least one of the first and the second CRNNs further comprises a sigmoid activation function for the last of the deconvolutional layers.

11. The system of claim 1, wherein, to estimate an echo path delay based on the echo signal and the reference signal, the FC network is further configured to calculate a cross-correlation between the echo signal and the reference signal.

12. The system of claim 11, wherein the FC network comprises a plurality of dense layers mapping the cross-correlation to a vector, and the vector represents a delay in samples.

13. A computer-implemented method for echo cancellation, comprising:
obtaining a reference signal, a microphone signal, and a trained multi-task deep neural network, wherein the multi-task deep neural network comprises a first neural network and a second neural network;
generating, using the first neural network of the multi-task deep neural network, an estimated echo path delay based on the reference signal and the microphone signal, wherein the first neural network comprises a first convolutional recurrent neural network (CRNN) and a fully-connected (FC) network, the first CRNN is trained to estimate echo from the microphone signal based on the reference signal, and the FC network is trained to estimate an echo path delay based on the estimated echo and the reference signal;
updating the reference signal based on the estimated echo path delay; and
generating, using the second neural network of the multi-task deep neural network, an enhanced microphone signal based on the microphone signal and the updated reference signal compensated by the estimated echo path delay.

14. The method of claim 13, wherein before generating the estimated echo path delay, the method further comprises:
concatenating the reference signal and the microphone signal to obtain a concatenated signal; and
encoding the concatenated signal to obtain log-magnitude spectra.

15. The method of claim 14, wherein encoding the concatenated signal comprises:
encoding the concatenated signal to obtain log-magnitude spectra by a short-time Fourier transform.

16. The method of claim 13, wherein the second neural network comprises a second convolutional recurrent neural network (CRNN).

17. The method of claim 16, wherein at least one of the first and the second CRNNs comprises a plurality of two-dimensional (2-D) convolutional layers and a plurality of deconvolutional layers corresponding to the plurality of 2-D convolutional layers.

18. The method of claim 17, wherein the at least one of the first and the second CRNNs further comprises one or more bidirectional long-short term memory (BLSTM) layers between the plurality of 2-D convolutional layers and deconvolutional layers.

19. The method of claim 17, wherein the at least one of the first and the second CRNNs further comprises an exponential linear unit (ELU) as an activation function for each of the plurality of 2-D convolutional layers and deconvolutional layers except for the last of the deconvolutional layers.

20. A non-transitory computer-readable storage medium coupled to one or more processors and comprising instructions that, when executed by the one or more processors, cause the one or more processors to perform operations comprising:

obtaining a reference signal, a microphone signal, and a trained multi-task deep neural network, wherein the multi-task deep neural network comprises a first neural network and a second neural network;

generating, using the first neural network of the multi-task deep neural network, an estimated echo path delay based on the reference signal and the microphone signal, wherein the first neural network comprises a first convolutional recurrent neural network (CRNN) and a fully-connected (FC) network, the first CRNN is trained to estimate echo from the microphone signal based on the reference signal, and the FC network is trained to estimate an echo path delay based on the estimated echo and the reference signal;

updating the reference signal based on the estimated echo path delay; and generating, using the second neural network of the multi-task deep neural network, an enhanced microphone signal based on the microphone signal and the updated reference signal compensated by the estimated echo path delay.

* * * * *